US008886145B2

(12) United States Patent
Matsui et al.

(10) Patent No.: US 8,886,145 B2

(45) Date of Patent: Nov. 11, 2014

(54) ANTENNA ADJUSTMENT CIRCUIT, ANTENNA ADJUSTMENT METHOD, AND COMMUNICATION UNIT

(75) Inventors: Hiroshi Matsui, Kanagawa (JP); Bernie Griffiths, Scotts Valley, CA (US)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 13/430,208

(22) Filed: Mar. 26, 2012

(65) Prior Publication Data

US 2013/0249750 A1 Sep. 26, 2013

(51) Int. Cl.

*H04B 1/18* (2006.01)
*H04B 5/00* (2006.01)

(52) U.S. Cl.

USPC .................................... 455/193.1; 455/41.1

(58) Field of Classification Search

USPC ............ 455/41.1, 41.2, 120, 121, 123, 193.1, 455/193.2; 343/745

See application file for complete search history.

(56) References Cited

U.S. PATENT DOCUMENTS

| | | | | |
|---|---|---|---|---|
| 2006/0176777 | A1* | 8/2006 | Ihara | 368/47 |
| 2010/0304698 | A1* | 12/2010 | Someya | 455/193.1 |
| 2011/0148583 | A1* | 6/2011 | Roosenboom et al. | 340/10.1 |
| 2011/0205133 | A1* | 8/2011 | Fukasawa | 343/745 |
| 2011/0248832 | A1* | 10/2011 | Waffaoui et al. | 340/10.5 |
| 2012/0129477 | A1* | 5/2012 | Someya | 455/193.1 |
| 2014/0054385 | A1* | 2/2014 | Stewart | 235/492 |

FOREIGN PATENT DOCUMENTS

| | | |
|---|---|---|
| JP | 11-355367 | 12/1999 |
| JP | 2006-304367 | 11/2006 |
| JP | 2007-43699 | 2/2007 |

* cited by examiner

*Primary Examiner* — Nguyen Vo

(74) *Attorney, Agent, or Firm* — Rader, Fishman & Grauer PLLC

(57) ABSTRACT

An antenna adjustment circuit includes: a drive section that inputs an alternating drive signal to a variable capacitance connected to an antenna; and a control section that sets a capacitance value of the variable capacitance, based on a phase of an output signal derived from the variable capacitance.

19 Claims, 13 Drawing Sheets

ANTENNA ADJUSTMENT CIRCUIT, ANTENNA ADJUSTMENT METHOD, AND COMMUNICATION UNIT

BACKGROUND

The disclosure relates to an antenna adjustment circuit, an antenna adjustment method, and a communication unit, in which a resonance frequency of an antenna is adjusted.

In recent years, there has been often used a communication technique called near-field communication (NFC). The near-field communication is a non-contact communication of which communication range is around tens of centimeters. An example of such a communication technique in Japan includes FeliCa (registered trademark). A communication function of the near-field communication is often provided such as in an IC card and a portable telephone, which may be held over a piece of equipment to thereby perform such as authentication in passing through a ticket gate of transportation including trains and in entering a building. The applicability of the near-field communication has been further expanded nowadays through the use of such near-field communication for electronic money, for example.

Such an IC card, a portable telephone (a communication unit), or the like that has the function of the near-field communication includes therein such as an antenna and a circuit for transmitting and receiving data through the antenna. As for such antenna, circuit, and the like, various studies have been made, as disclosed in Japanese Patent Registration Nos. 3874145, 4379446, and 4609394, for example.

SUMMARY

In the near-field communication, a resonance frequency of an antenna is an important parameter that exerts influence on communication properties. Hence, in a production process of a communication unit used for the near-field communication, an antenna is incorporated in the communication unit, following which a resonance frequency of the antenna is so adjusted as to allow the resonance frequency to fall within a predetermined frequency range. In performing the adjustment, it is desirable that the resonance frequency be adjusted efficiently in a simple way.

It is desirable to provide an antenna adjustment circuit, an antenna adjustment method, and a communication unit, capable of adjusting a resonance frequency of an antenna efficiently in a simple way.

An antenna adjustment circuit according to an embodiment of the technology includes: a drive section inputting an alternating drive signal to a variable capacitance connected to an antenna; and a control section setting a capacitance value of the variable capacitance, based on a phase of an output signal derived from the variable capacitance.

An antenna adjustment method according to an embodiment of the technology includes: inputting an alternating drive signal to a variable capacitance connected to an antenna; and setting a capacitance value of the variable capacitance, based on a phase of an output signal derived from the variable capacitance.

A communication unit according to an embodiment of the technology includes an antenna, a communication section performing communication using the antenna, and an antenna adjustment circuit. The antenna adjustment circuit includes: a drive section inputting an alternating drive signal to a variable capacitance connected to the antenna; and a control section setting a capacitance value of the variable capacitance, based on a phase of an output signal derived from the variable capacitance.

In the antenna adjustment circuit, the antenna adjustment method, and the communication unit according to the above-described embodiments of the technology, the capacitance value of the variable capacitance is set to thereby adjust a resonance frequency of the antenna. The capacitance value of the variable capacitance, when the alternating drive signal is inputted to the variable capacitance, is set based on the phase of the output signal outputted from that variable capacitance.

According to the antenna adjustment circuit, the antenna adjustment method, and the communication unit in the above-described embodiments of the technology, the capacitance value of the variable capacitance is set based on the phase of the output signal outputted from the variable capacitance. Hence, it is possible to adjust the resonance frequency of the antenna efficiently in a simple way.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the technology will be described below in detail with reference to the drawings.

[Configuration Example]

(Overall Configuration Example)

Figure 1:
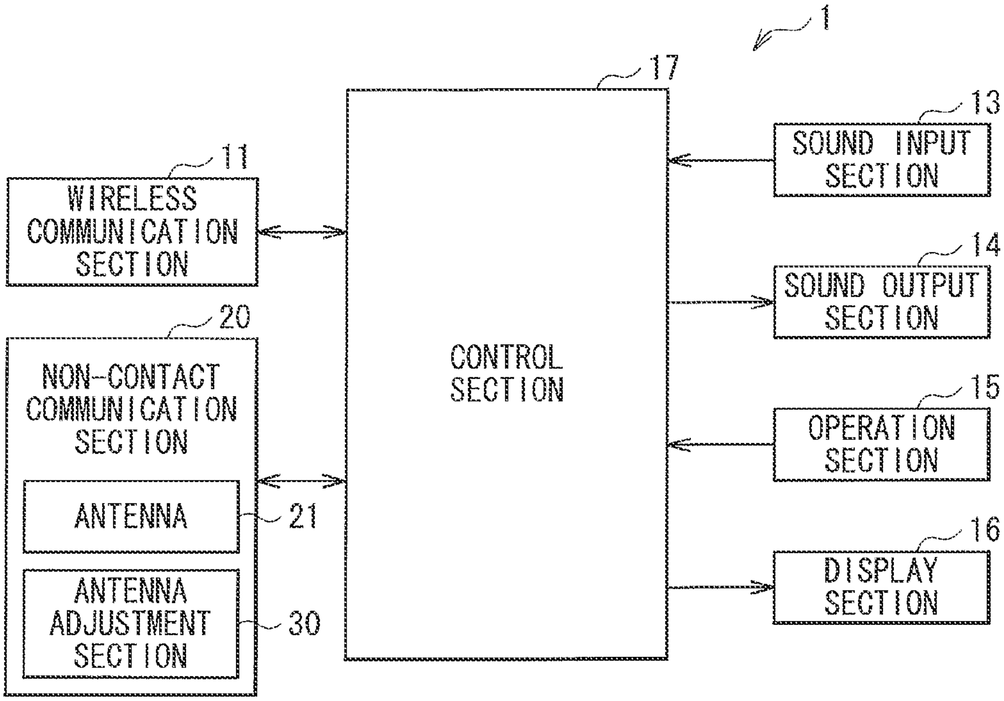
FIG. 1 is a block diagram illustrating a configuration example of a portable telephone according to an embodiment of the technology.

FIG. 1 illustrates a configuration example of a portable telephone (a portable telephone 1) according to an embodiment. This portable telephone 1 performs near-field communication in a non-contact manner. It is to be noted that each of an antenna adjustment method and a communication unit according to an embodiment of the technology is embodied by the present embodiment and thus will be described together herein.

The portable telephone 1 includes a wireless communication section 11, a non-contact communication section 20, a sound input section 13, a sound output section 14, an operation section 15, a display section 16, and a control section 17.

The wireless communication section 11 performs wireless communication for a voice call with a base station of the portable telephone.

The non-contact communication section 20 performs the near-field communication with an external communication unit. As will be described later in detail, the non-contact communication section 20 includes an antenna 21, and an antenna adjustment circuit 30 adjusting a resonance frequency of the antenna 21.

Further, the non-contact communication section 20 has two operation modes, namely, an antenna adjustment mode M1 and a normal operation mode M2. The antenna adjustment mode M1 is an operation mode of adjusting the resonance frequency of the antenna 21, and used in a production process of the portable telephone 1. The normal operation mode M2 is an operation mode of performing non-contact communication by using an adjustment result in the antenna adjustment mode M1, and the non-contact communication section 20 usually operates in this operation mode when the portable telephone 1 is used by a user.

The sound input section 13 and the sound output section 14 are sections enabling the user to make a voice call by using the portable telephone 1. The sound input section 13 is a microphone, and the sound output section 14 is a speaker. The operation section 15 is a section provided to operate the portable telephone 1. The display section 16 is a section provided to display a state of the portable telephone 1.

The control section 17 performs predetermined processing, thereby controlling the wireless communication section 11, the non-contact communication section 20, the sound input section 13, the sound output section 14, the operation section 15, and the display section 16.

(Non-Contact Communication Section 20)

Figure 2:
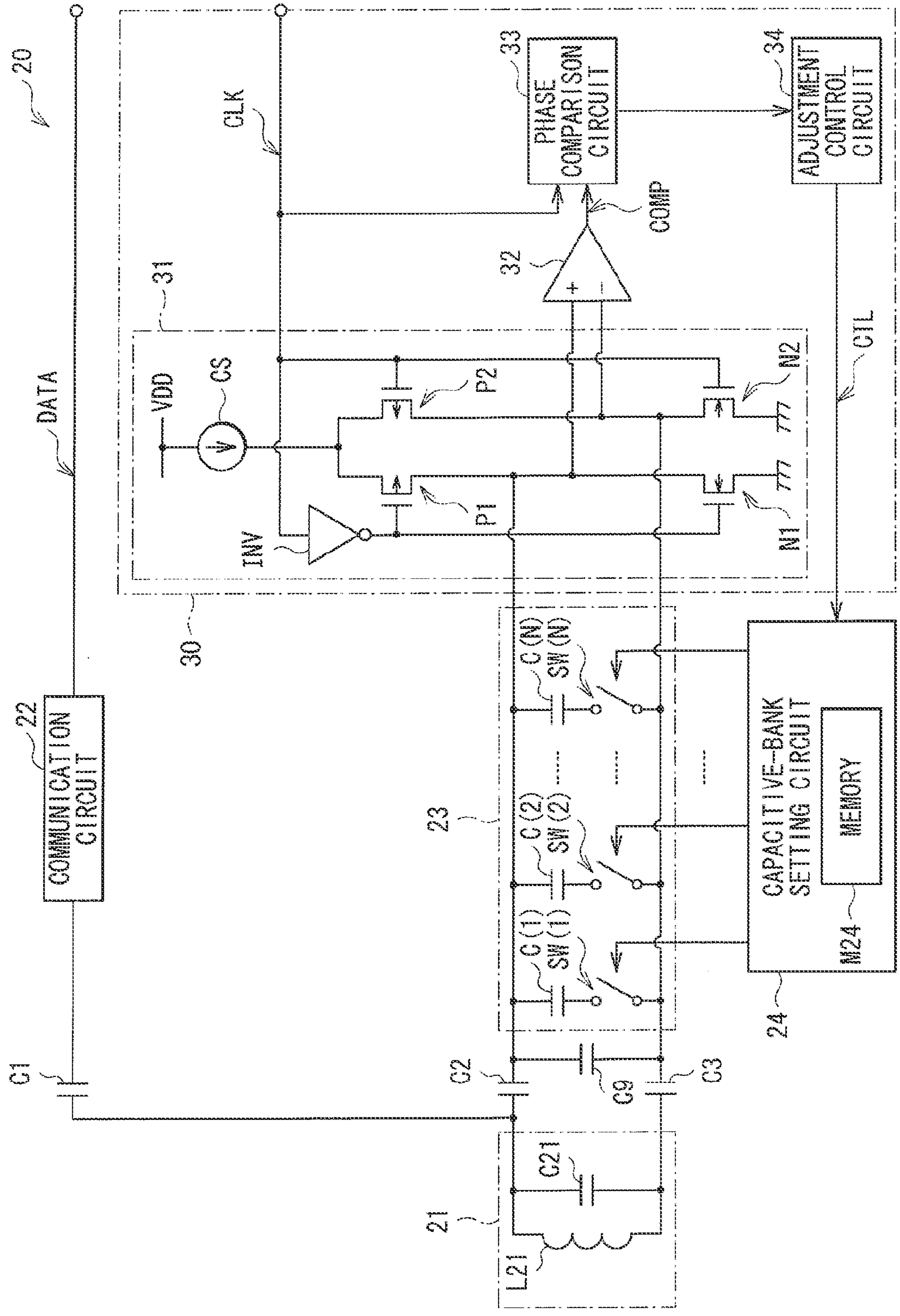
FIG. 2 is a circuit diagram illustrating a configuration example of a non-contact communication section depicted in FIG. 1.

FIG. 2 illustrates a configuration example of the non-contact communication section 20. The non-contact communication section 20 includes the antenna 21, a communication circuit 22, a capacitive device C9, a capacitive bank 23, a capacitive-bank setting circuit 24, and the antenna adjustment circuit 30.

The antenna 21 is an antenna used to transmit and receive data by the near-field communication with the external communication unit, in the normal operation mode M2. In this embodiment, as for the antenna 21, an equivalent circuit is represented by parallel connection of an inductor L21 and a capacitive device C21. In other words, a first end of the inductor L21 and a first end of the capacitive device C21 are connected to each other, and a second end of the inductor L21 and a second end of the capacitive device C21 are connected to each other.

Figure 3:
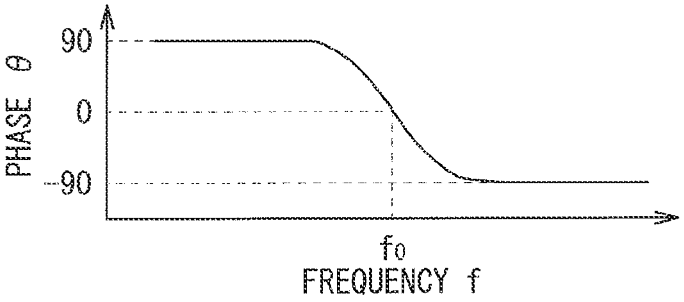
FIG. 3 is a characteristic diagram illustrating a characteristic example of an antenna depicted in FIG. 2.

FIG. 3 illustrates an example of a phase characteristic of impedance between both terminals of the antenna 21. A phase θ decreases from about 90 degrees as a frequency rises, and after reaching about 0 degree at a frequency fo, the phase θ decreases towards approximately minus 90 degrees. In other words, the antenna 21 performs parallel resonance at the frequency fo (resonance frequency).

The communication circuit 22 is a circuit transmitting and receiving data by the near-field communication with the external communication unit, in the normal operation mode M2. This communication circuit 22 is connected to a first end of the antenna 21 via a capacitive device C1. In this embodiment, the communication circuit 22 communicates with the external communication unit by using a carrier wave of about 13.56 [MHz]. In addition, the communication circuit 22 exchanges data DATA which is to be transmitted or received, with the control section 17. Based on this configuration, the communication circuit 22 transmits the data DATA supplied by the control section 17 to the external communication unit through the antenna 21, or receives data transmitted by the external communication unit with the antenna 21 and supplies the received data to the control section 17 as the data DATA.

The capacitive device C9 and the capacitive bank 23 are provided to make an adjustment thereby bringing the resonance frequency of the antenna 21 closer to a target frequency ftgt. This target frequency ftgt is a parameter determined by a communication property in the near-field communication, and is, for example, about 13.9 [MHz]. The capacitive device C9 is provided to bring the resonance frequency of the antenna 21 closer to the target frequency ftgt, and the capacitive bank 23 is provided to make a fine adjustment thereby bringing the resonance frequency further closer to the target frequency ftgt.

As for the capacitive device C9, a first end is connected to the first end of the antenna 21 through a capacitive device C2, and a second end is connected to a second end of the antenna 21 through a capacitive device C3.

The capacitive bank 23 has capacitive devices C(1) to C(N) and switches SW(1) to SW(N), where N is a natural number. As for the capacitive devices C(1) to C(N), first ends are connected to each other and also connected to the first end of the capacitive device C9, and second ends are connected to first ends of the respective switches SW(1) to SW(N). As for the switches SW(1) to SW(N), the first ends are connected to the second ends of the respective capacitive devices C(1) to C(N), and second ends of the switches SW(1) to SW(N) are connected to each other and also connected to the second end of the capacitive device C9.

Capacitance values of the respective capacitive devices C(1) to C(N) are weighted to be, for example, $1:2:4:\ldots:2^{N-1}$. As will be described later, the switches SW(1) to SW(N) have ON resistances sufficiently lower than impedances of the corresponding capacitive devices C(1) to C(N), thereby increasing a Q factor (Quantity Factor) of the antenna. Specifically, the ON resistances of the switches SW(1) to SW(N) are weighted to be, for example, $2^{N-1}:\ldots:4:2:1$. This allows a product of the capacitance value of the capacitive device C(n) ("n" is any of 1 to N both inclusive) and the ON resistance of the switch SW(n) connected to the capacitive device C(n), to become approximately constant without depending on "n".

In this embodiment, the capacitive bank 23 is integrated into one chip, together with the capacitive-bank setting circuit 24 and the antenna adjustment circuit 30, although it is not limited thereto. For example, one or more of the capacitive bank 23, the capacitive-bank setting circuit 24, and the antenna adjustment circuit 30 may be configured as a separate chip. In one embodiment where the capacitive bank 23 is provided as a separate chip, a MMIC (Monolithic Microwave Integrated Circuit) may be used, for example.

The capacitive-bank setting circuit 24 sets a capacitance value of the capacitive bank 23. The capacitive-bank setting circuit 24 has a memory M24. The memory M24 is a non-volatile memory, and holds data used to set ON/OFF of each of the switches SW(1) to SW(N) in the capacitive bank 23.

As will be described later, in the antenna adjustment mode M1, the capacitive-bank setting circuit 24 sets the capacitance value of the capacitive bank 23, by controlling each of the switches SW(1) to SW(N) of the capacitive bank 23 based on a control signal CTL supplied from an adjustment control circuit 34. The capacitive-bank setting circuit 24 stores an adjustment result in the memory M24, based on an instruction from the adjustment control circuit 34. Further, in the normal operation mode M2, the capacitive-bank setting circuit 24 sets the capacitance value of the capacitive bank 23, by controlling each of the switches SW(1) to SW(N) of the capacitive bank 23 based on the data stored in the memory M24.

The antenna adjustment circuit 30 is a circuit adjusting the resonance frequency of the antenna 21 based on a clock signal CLK, in the antenna adjustment mode M1. This antenna adjustment circuit 30 includes a drive section 31, a comparator 32, a phase comparison circuit 33, and the adjustment control circuit 34.

The clock signal CLK is a logic signal changing between a high level and a low level, and a frequency of the clock signal CLK is the same as the target frequency ftgt of the resonance frequency of the antenna 21. This clock signal CLK is supplied from outside of the portable telephone 1, when the resonance frequency of the antenna 21 is adjusted (the antenna adjustment mode M1).

The drive section 31 includes an inverter INV, transistors N1, N2, P1, and P2, and a current source CS. The inverter INV inverts and then outputs the clock signal CLK. In this embodiment, the transistors N1 and N2 are N-type MOS (Metal Oxide Semiconductor) transistors, and the transistors P1 and P2 are P-type MOS transistors. In the transistor N1, a drain is connected to a drain of the transistor P1 and also connected to the first end of the capacitive device C9 as well as a first end of the capacitive bank 23, a gate is connected to an output terminal of the inverter INV, and a source is grounded. In the transistor P1, the drain is connected to the drain of the transistor N1 and also connected to the first end of the capacitive device C9 as well as the first end of the capacitive bank 23, a gate is connected to the output terminal of the inverter INV, and a source is connected to a first end of the current source CS. In the transistor N2, a drain is connected to a drain of the transistor P2 and also connected to the second end of the capacitive device C9 as well as the second end of the capacitive bank 23, a gate is supplied with the clock signal CLK, and a source is grounded. In the transistor P2, the drain is connected to the drain of the transistor N2 and also connected to the second end of the capacitive device C9 as well as the second end of the capacitive bank 23, a gate is supplied with the clock signal CLK, and a source is connected to the first end of the current source CS. The current source CS is a circuit feeding a constant current.

The comparator 32 is a circuit comparing voltages at both ends of the capacitive device C9 and the capacitive bank 23, and outputting a comparison result as a signal COMP. Specifically, the comparator 32 amplifies a voltage between both ends of the capacitive device C9 and the capacitive bank 23. A positive input terminal of the comparator 32 is connected to the drains of the transistors N1 and P1, and the first end of the capacitive device C9 as well as the first end of the capacitive bank 23. A negative input terminal of the comparator 32 is connected to the drains of the transistors N2 and P2, and the second end of the capacitive device C9 as well as the second end of the capacitive bank 23.

The phase comparison circuit 33 compares phases between the clock signal CLK and the signal COMP, and outputs information on a phase difference $\Delta\theta$ to the adjustment control circuit 34.

The adjustment control circuit 34 generates the control signal CTL, based on the information on the phase difference between the clock signal CLK and the signal COMP, which is supplied from the phase comparison circuit 33. The adjustment control circuit 34 then supplies the generated control signal CTL to the capacitive-bank setting circuit 24.

Based on this configuration, as will be described later, the adjustment control circuit 34 variously sets the capacitance value in the capacitive bank 23, and the phase comparison circuit 33 compares the phases between the clock signal CLK and the signal COMP in each of the capacitance values, in the antenna adjustment mode M1. The adjustment control circuit 34 acquires setting of the capacitance value of the capacitive bank 23, the setting allowing the phase difference $\Delta\theta$ to fall within a predetermined range, and stores data on the setting in the memory M24 of the capacitive-bank setting circuit 24.

Here, the capacitive bank 23 corresponds to a specific but not limitative example of "variable capacitance" in one embodiment of the technology. The adjustment control circuit 34 corresponds to a specific but not limitative example of "control section" in one embodiment of the technology. The transistors P2 and N2 correspond to a specific but not limitative example of "first transistor" and a specific but not limitative example of "second transistor", respectively, in one embodiment of the technology. The transistors P1 and N1 correspond to a specific but not limitative example of "third transistor" and a specific but not limitative example of "fourth transistor", respectively, in one embodiment of the technology. The comparator 32 corresponds to a specific but not limitative example of "amplification section" in one embodiment of the technology.

[Operation and Function]

Next, operation and function of the portable telephone 1 of the present embodiment will be described.

(Summary of Overall Operation)

First, a summary of overall operation of the portable telephone 1 will be described with reference to FIGS. 1 and 2. The wireless communication section 11 performs wireless communication with the base station of the portable telephone. During a call, the sound input section 13 inputs voice of the user, and the sound output section 14 outputs a sound. The operation section 15 inputs information according to operation of the user, and the display section 16 displays a state of the portable telephone 1.

The non-contact communication section 20 performs the near-field communication with the external communication unit. Specifically, in the normal operation mode M2, the capacitive bank 23 is set based on the setting data stored in the memory M24, and the communication circuit 22 performs the near-field communication with the external communication unit. The setting data of the memory M24 is stored in the production process (in the antenna adjustment mode M1) of the portable telephone 1, after the resonance frequency of the antenna 21 is adjusted by the antenna adjustment circuit 30.

The control section 17 controls the wireless communication section 11, the non-contact communication section 20, the sound input section 13, the sound output section 14, the operation section 15, and the display section 16.

(Operation in Antenna Adjustment Mode M1)

In the production process of the portable telephone 1, after the antenna, a transmitter-receiver circuit, and the like are incorporated into the portable telephone 1, the non-contact communication section 20 operates in the antenna adjustment mode M1, and adjusts the resonance frequency of the antenna 21.

Figure 4:
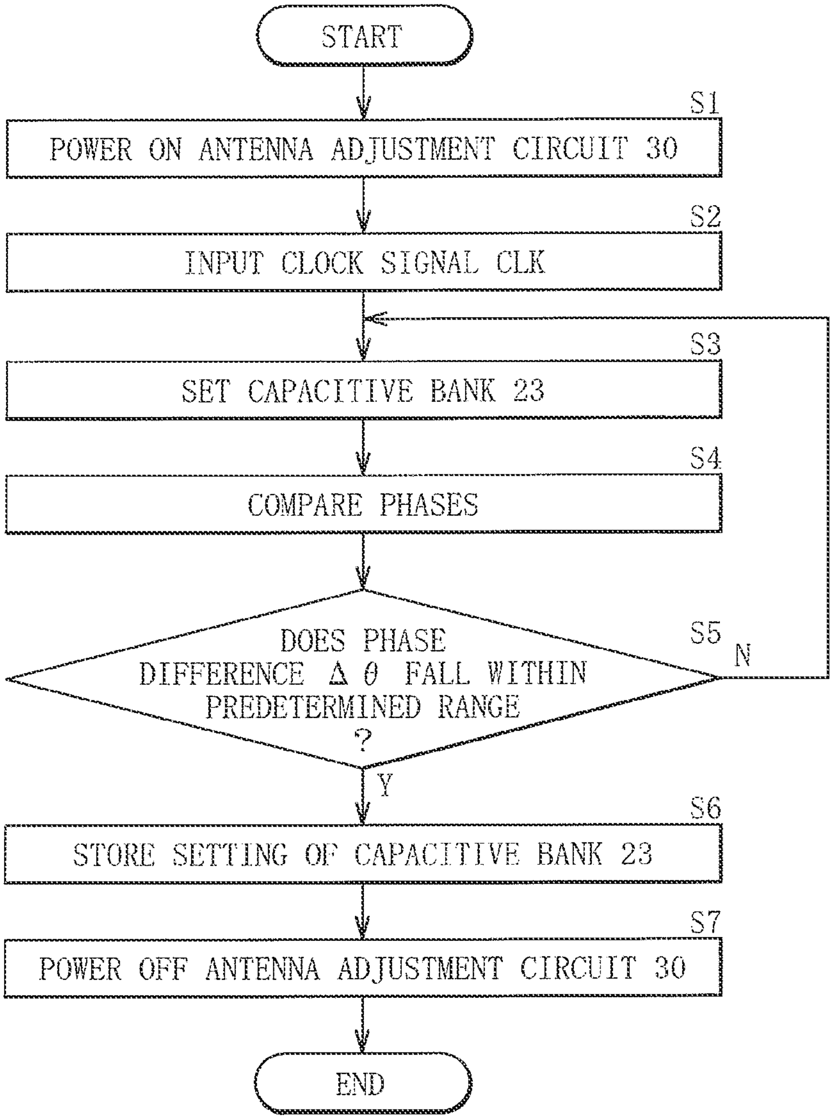
FIG. 4 is a flowchart illustrating an example of adjustment operation in the non-contact communication section depicted in FIG. 1.

FIG. 4 illustrates a flowchart of operation of the non-contact communication section 20 in the antenna adjustment mode M1. The non-contact communication section 20 adjusts the resonance frequency of the antenna 21, by comparing the phases between the clock signal CLK and the signal COMP while changing the capacitance value of the capacitive bank 23. The details will be described below.

First, the control section 17 powers on the antenna adjustment circuit 30 (step S1).

Next, the clock signal CLK is inputted from outside of the portable telephone 1 (step S2). In this embodiment, the frequency of the clock signal CLK is about 13.9 [MHz]. Based on this clock signal CLK, the drive section 31 outputs an alternating current to the antenna 21, the capacitive device C9, and the capacitive bank 23.

Figure 5B:
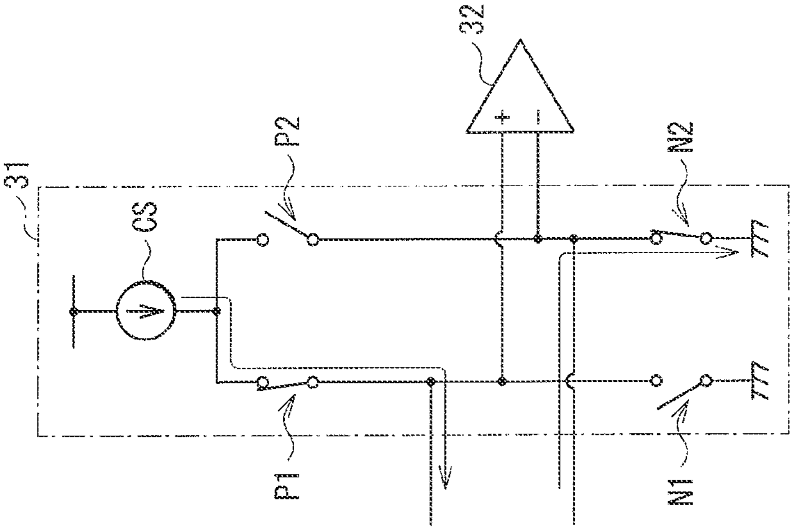
FIGS. 5A and 5B are explanatory diagrams illustrating an operation example of a drive section depicted in FIG. 2.
Figure 5A:
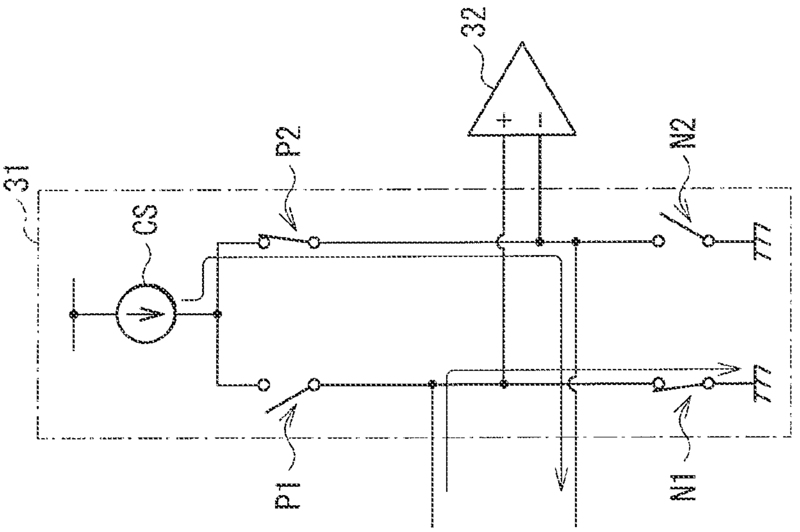

FIGS. 5A and 5B illustrate an operation example of the drive section 31. FIG. 5A illustrates a state when the clock signal CLK is at a low level, and FIG. 5B illustrates a state when the clock signal CLK is at a high level. In these FIGS. 5A and 5B, the transistors N1, N2, P1, and P2 are each illustrated as a switch indicating an ON-OFF state.

When the clock signal CLK is at the low level, the transistors N1 and P2 are in the ON state and the transistors N2 and P1 are in the OFF state, as illustrated in FIG. 5A. Thus, a current supplied from the current source CS flows to a ground through the transistor P2, the antenna 21 etc., and the transistor N1.

On the other hand, when the clock signal CLK is at the high level, the transistors N2 and P1 are in the ON state and the transistors N1 and P2 are in the OFF state, as illustrated in FIG. 5B. Thus, a current supplied from the current source CS flows to the ground through the transistor P1, the antenna 21 etc., and the transistor N2.

In this way, the currents (alternating currents) opposite in direction flow through the antenna 21, the capacitive device C9, and the capacitive bank 23, according to a voltage level of the clock signal CLK.

Next, the adjustment control circuit 34 instructs the capacitive-bank setting circuit 24 to set the capacitive bank 23 by supplying the control signal CTL to the capacitive-bank setting circuit 24, and the capacitive-bank setting circuit 24 sets the capacitance value of the capacitive bank 23 based on the control signal CTL (step S3). In this embodiment, the adjustment control circuit 34 first instructs the capacitive-bank setting circuit 24 to set the capacitance value of the capacitive bank 23 to the smallest value.

This causes an alternating voltage having an amplitude and a phase corresponding to the capacitance value of the capacitive bank 23, between both ends of each of the antenna 21, the capacitive device C9, and the capacitive bank 23. In other words, the alternating current supplied by the drive section 31 is converted into the alternating voltage by the impedance of the antenna 21 and the like as illustrated in FIG. 3. The comparator 32 generates the signal COMP based on that alternating voltage.

Then, the phase comparison circuit 33 compares the phases between the clock signal CLK and the signal COMP, and outputs the information on the phase difference Δθ (step S4).

Then, the adjustment control circuit 34 determines whether this phase difference Δθ falls within in a predetermined range Ra (step S5). Here, the predetermined range Ra is, for example, a range of about minus 5 degrees to about 5 degrees both inclusive. When the phase difference Δθ falls outside this predetermined range, the flow returns to step S3, the capacitance value of the capacitive bank 23 is reset to a next greater value, and steps S3 to S5 are repeated.

Figure 6:
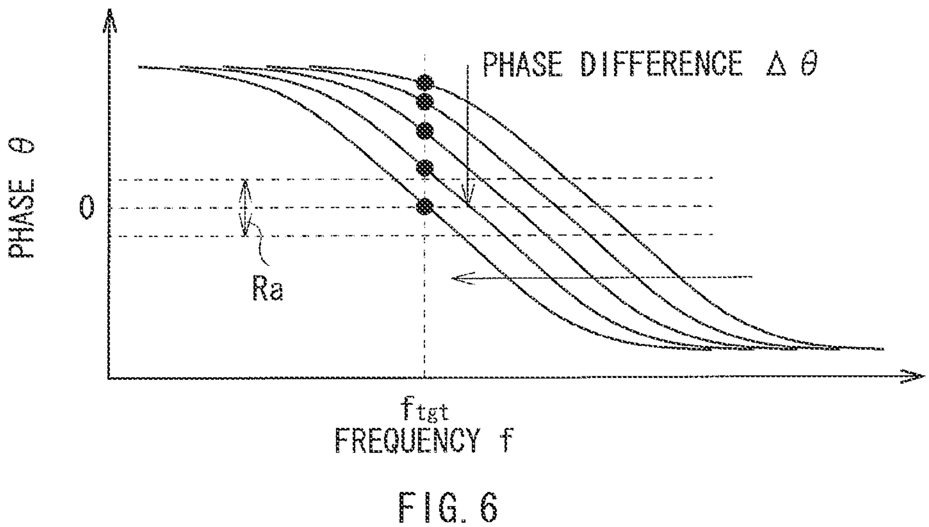
FIG. 6 is an explanatory diagram illustrating an example of the adjustment operation in the non-contact communication section depicted in FIG. 2.

FIG. 6 illustrates operation in steps S3 to S5. In FIG. 6, a plurality of curves illustrate a phase characteristic of the impedance of the antenna 21, the capacitive device C9, and the capacitive bank 23. As illustrated in FIG. 6, when the capacitance value of the capacitive bank 23 is increased, the phase characteristic moves to a low frequency side, and the phase θ in the target frequency ftgt decreases accordingly. In other words, the phase difference Δθ between the clock signal CLK and the signal COMP decreases. The adjustment control circuit 34 performs control of increasing the capacitance value of the capacitive bank 23 gradually, until the phase difference Δθ falls within the predetermined range Ra in which zero is in a center.

When the phase difference Δθ falls within the predetermined range Ra in step S5, the memory M24 of the capacitive-bank setting circuit 24 stores the setting data of the capacitive bank 23 (step S6).

Then, the control section 17 powers off the antenna adjustment circuit 30 (step S7).

This ends the flow.

For the portable telephone 1 produced by such a process, it is possible to perform the near-field communication with the external communication unit without making an adjustment of the resonance frequency of the antenna 21, when the portable telephone 1 is used by the user after being produced. In other words, the portable telephone 1 is allowed to perform the near-field communication by setting the capacitance value of the capacitive bank 23 based on the setting data stored in the memory M24, without performing such an adjustment.

In the portable telephone 1, as described above, the adjustment of the resonance frequency of the antenna 21 is made based on the clock signal CLK supplied from the outside. This makes it possible to perform the adjustment in the production process efficiently, as will be described below.

In general, when a resonance frequency of an antenna incorporated in a portable telephone is to be adjusted, a method may be contemplated in which a measurement of the resonance frequency of the antenna built in the portable telephone is performed from outside of the portable telephone by using, for example, a network analyzer, and thereby a capacitance value of a capacity bank in the portable telephone is adjusted based on a result of the measurement. In this case, it is likely that efficiency in an adjustment process is reduced, since only the portable telephones corresponding to the number of network analyzers prepared in the production process can be adjusted simultaneously. Also, it is necessary to prepare a control unit, used to adjust the capacitance value of the capacity bank in the portable telephone from outside of the portable telephone.

In contrast, in the portable telephone 1, the antenna adjustment circuit 30 built in the portable telephone 1 measures the resonance frequency of the antenna 21, and adjusts the capacitance value of the capacitive bank 23. In other words, each of the portable telephones 1 itself is allowed to perform the adjustment of the resonance frequency of the antenna 21 without using such as the network analyzer and the control unit used for the adjustment described above. Hence, a larger number of portable telephones 1 are adjusted simultaneously, making it possible to increase the efficiency in adjustment operation.

Further, in the portable telephone 1, the phase difference between the clock signal CLK and the signal COMP is detected, and the adjustment of the resonance frequency of the antenna 21 is made based on that phase difference. In other words, in the portable telephone 1, the adjustment is performed utilizing the phase characteristic of the impedance of such as the antenna 21. This makes it possible to adjust the resonance frequency with high accuracy. For example, although a fact that a magnitude of the impedance of such as the antenna 21 increases in the resonance frequency may be utilized to perform the adjustment of the antenna 21, this may cause a reduction in adjustment accuracy due to such as noise. In contrast, in the portable telephone 1, the phase characteristic of the impedance of such as the antenna 21 is used, making it possible to perform the adjustment with high accuracy.

Moreover, in the portable telephone 1, the ON resistance of the switch SW(n) is made sufficiently smaller than the impedance of the capacitive device C(n) connected to that switch SW(n) in the capacitive bank 23, making it possible to increase communication properties. In general, in communications, it is desirable that a Q factor (Quality Factor) of an antenna be high. However, the Q factor falls with increasing resistance component, affecting communication properties. In the portable telephone 1, on the other hand, the ON resistance of the switch SW(n) is made sufficiently smaller than the impedance of the capacitive device C(n) to an extent that sufficient communication properties are ensured, making it possible to increase the communication properties.

In the portable telephone 1, in particular, the ON resistances of the switches SW(1) to SW(N) are weighted, and the product of the capacitance value of the capacitive device C(n) and the ON resistance of the switch SW(n) is made constant. Hence, it is possible to reduce a possibility that the communication properties are varied depending on setting of the capacitance value of the capacitive bank 23. For example, in a case where all the ON resistances of the switches SW(1) to SW(N) are equal such as in a configuration of the capacitive bank 23, it is likely that the Q factor is decreased when the capacitive device C(n) with the largest capacitance value is selected. In the capacitive bank 23, on the other hand, the product of the capacitance value of the capacitive device C(n) and the ON resistance of the switch SW(n) is made constant. Thus, a ratio in impedance between the capacitive device C(n) and the switch SW(n) is made approximately constant irrespective of "n", allowing the Q factor to be approximately constant even when any of the capacitive devices C(1) to C(N) is selected. Hence, it is possible to reduce a possibility that the communication properties are varied depending on the setting of the capacitance value of the capacitive bank 23.

[Effects]

In the present embodiment, the adjustment of the resonance frequency of the antenna is made based on the externally-supplied clock signal in the production process, eliminating the necessity of using such as the network analyzer. Hence, it is possible to perform the adjustment efficiently.

Also, in the present embodiment, the adjustment of the resonance frequency of the antenna is performed utilizing the phase characteristic of the impedance. Hence, the adjustment is made with high accuracy, as compared with the case where the magnitude of the impedance is utilized.

Further, in the present embodiment, the ON resistance of each of the switches in the capacity bank is weighted. Hence, it is possible to reduce a possibility that the communication properties are varied depending on the setting of the capacitance value of the capacity bank.

In addition, in the present embodiment, expensive components such as MMIC can be eliminated when the capacity bank is integrated into one chip together with such as the antenna adjustment circuit. Hence, it is possible to reduce costs.

[Modification 1]

In the embodiment described above, the clock signal CLK of about 13.9 [MHz] is supplied from the outside in the production process, although it is not limited thereto. Alternatively, in one embodiment, a clock generation section generating the clock signal CLK may be provided inside the portable telephone 1, and the clock signal CLK generated by the clock generation section may be used. Further, in one embodiment where a source generating a clock signal of about 13.9 [MHz] is provided in the wireless communication section 11 or the like, the signal generated by that clock signal source may be used. Furthermore, for example, in one embodiment where the wireless communication section 11 has a fractional-N PLL (Phase-Locked Loop) as a frequency synthesizer, the clock signal CLK may be generated using this frequency synthesizer. In a portable telephone, a standard clock of about 19.2 [MHz] is often used, which may be utilized in one embodiment to generate the clock signal CLK of about 13.9 [MHz] using the fractional-N PLL.

[Modification 2]

In the embodiment described above, the capacitance value of the capacitive bank 23 is gradually increased by one level at a time. Further, the changing of the capacitance value is stopped at the time when the phase difference $\Delta\theta$ has fallen within the predetermined range Ra to store the setting data in the memory M24, although it is not limited thereto. Alternatively, the capacitance value of the capacitive bank 23 may be increased by two or more levels at a time. Further, a capacitance value when the phase difference $\Delta\theta$ has fallen within the predetermined range Ra and a capacitance value when the phase difference $\Delta\theta$ has fallen out of the predetermined range Ra thereafter may be determined, to store setting data, which may be an average value of those capacitance values, in the memory M24.

[Modification 3]

In the embodiment described above, the drive section 31 supplies the currents to both terminals of each of the antenna 21, the capacitive device C9, and the capacitive bank 23, although it is not limited thereto. Alternatively, a current may be supplied to only one of the terminals of each of the antenna 21, the capacitive device C9, and the capacitive bank 23. This modification will be described below in detail.

Figure 7:
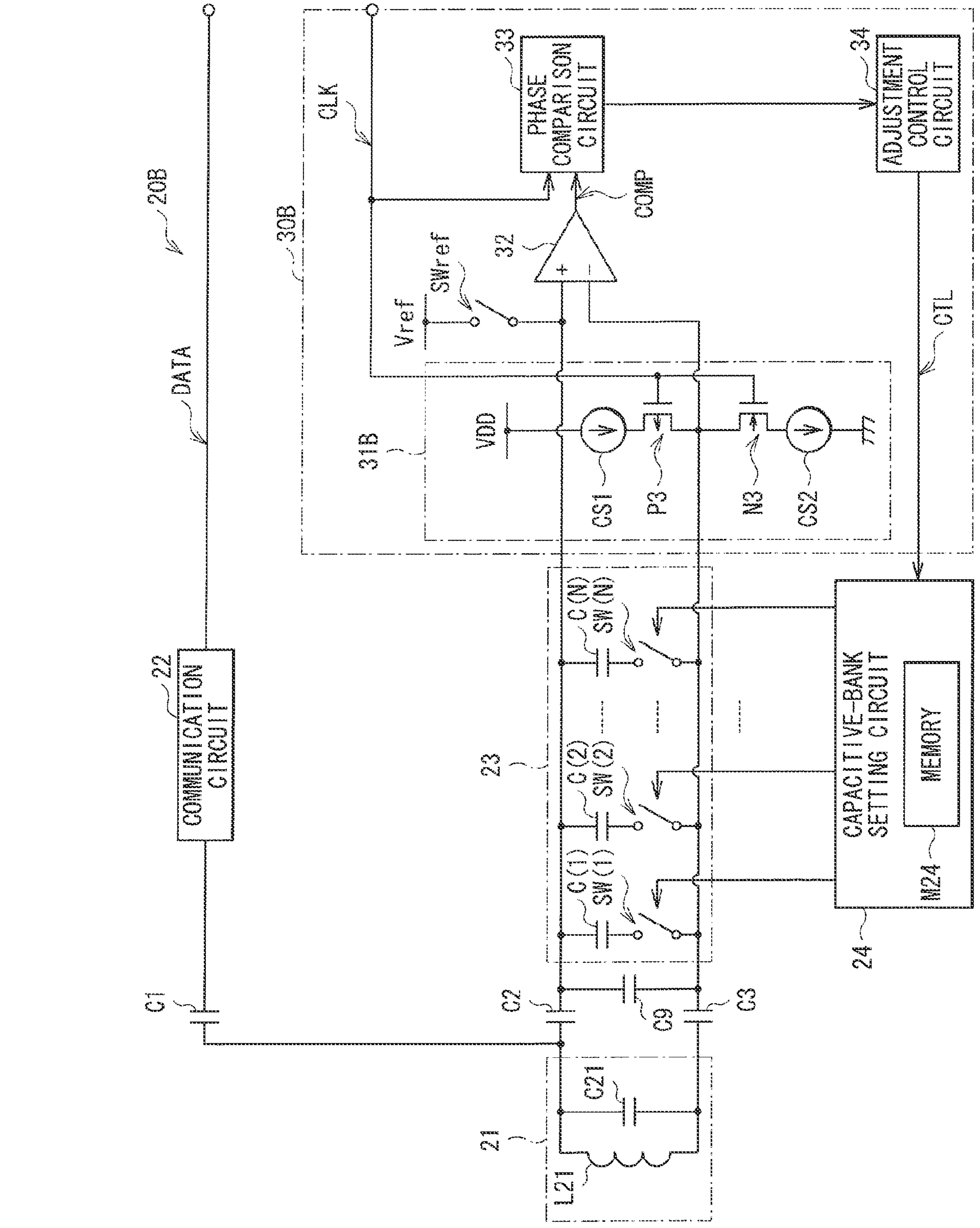
FIG. 7 is a circuit diagram illustrating a configuration example of a non-contact communication section according to a modification.

FIG. 7 illustrates a configuration example of a non-contact communication section 20B according to the present modification. The non-contact communication section 20B includes an antenna adjustment section 30B having a drive section 31B and a switch SWref.

The drive section 31B includes transistors N3 and P3, and current sources CS1 and CS2. The transistor N3 is an N-type MOS transistor, in which a drain is connected to the second end of the capacitive device C9 as well as the second end of the capacitive bank 23, a gate is supplied with the clock signal CLK, and a source is connected to a first end of the current source CS2. The transistor P3 is a P-type MOS transistor, in which a drain is connected to the drain of the transistor N3 and also connected to the second end of the capacitive device C9 as well as the second end of the capacitive bank 23, a gate is supplied with the clock signal CLK, and a source is connected to the current source CS1. The current sources CS1 and CS2 are circuits feeding constant currents.

The switch SWref is a switch being in an ON state in the antenna adjustment mode M1 and being in an OFF state in the normal operation mode M2. A first end of the switch SWref is supplied with a voltage Vref, and a second end is connected to a positive input terminal of the comparator 32. The voltage Vref is, for example, a voltage of about half a power supply voltage VDD. It is to be noted that, in the antenna adjustment mode M1, the voltage Vref may be supplied also to a negative input terminal side of the comparator 32 via a high resistance.

Effects similar to those of the embodiment described above are obtained in this configuration as well.

[Modification 4]

Figure 8:
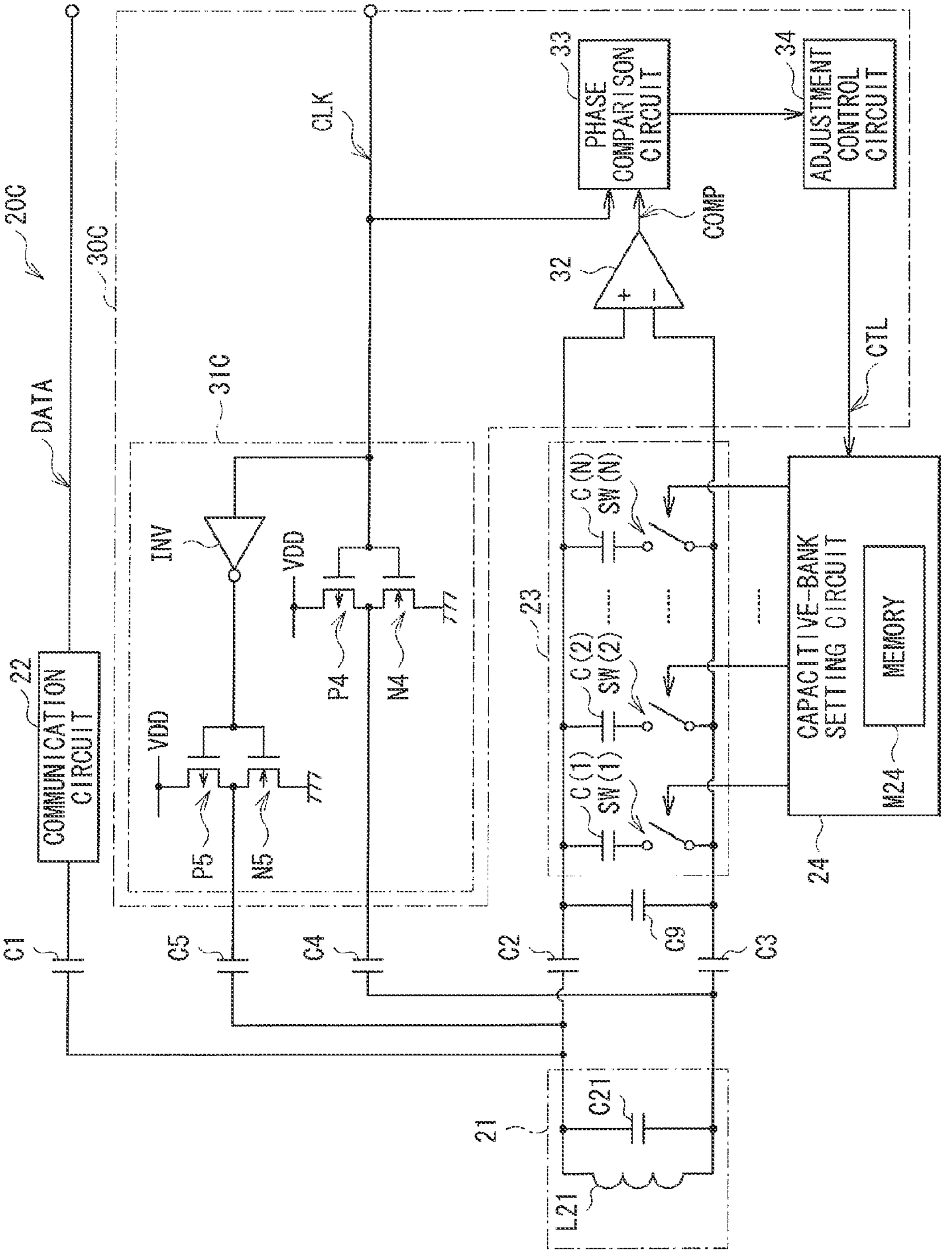
FIG. 8 is a circuit diagram illustrating a configuration example of a non-contact communication section according to another modification.

In the embodiment described above, the drive section 31 supplies the alternating current to the antenna 21 and the like, although it is not limited thereto. Alternatively, the drive section 31 may supply, for example, an alternating voltage as illustrated in FIG. 8. The drive section 31 according to the present modification has transistors N4, N5, P4, and P5. The transistors N4 and N5 are N-type MOS transistors, and the transistors P4 and P5 are P-type MOS transistors. The transistors N4 and P4, forming an inverter, invert the inputted clock signal CLK and supply an output signal to the second end of the antenna 21 through a capacitive device C4. The transistors N5 and P6, forming an inverter, invert an output signal of the inverter INV and supply an output signal to the first end of the antenna 21 through a capacitive device C5. Effects similar to those of the embodiment described above are obtained in this configuration as well.

[Modification 5]

Figure 9:
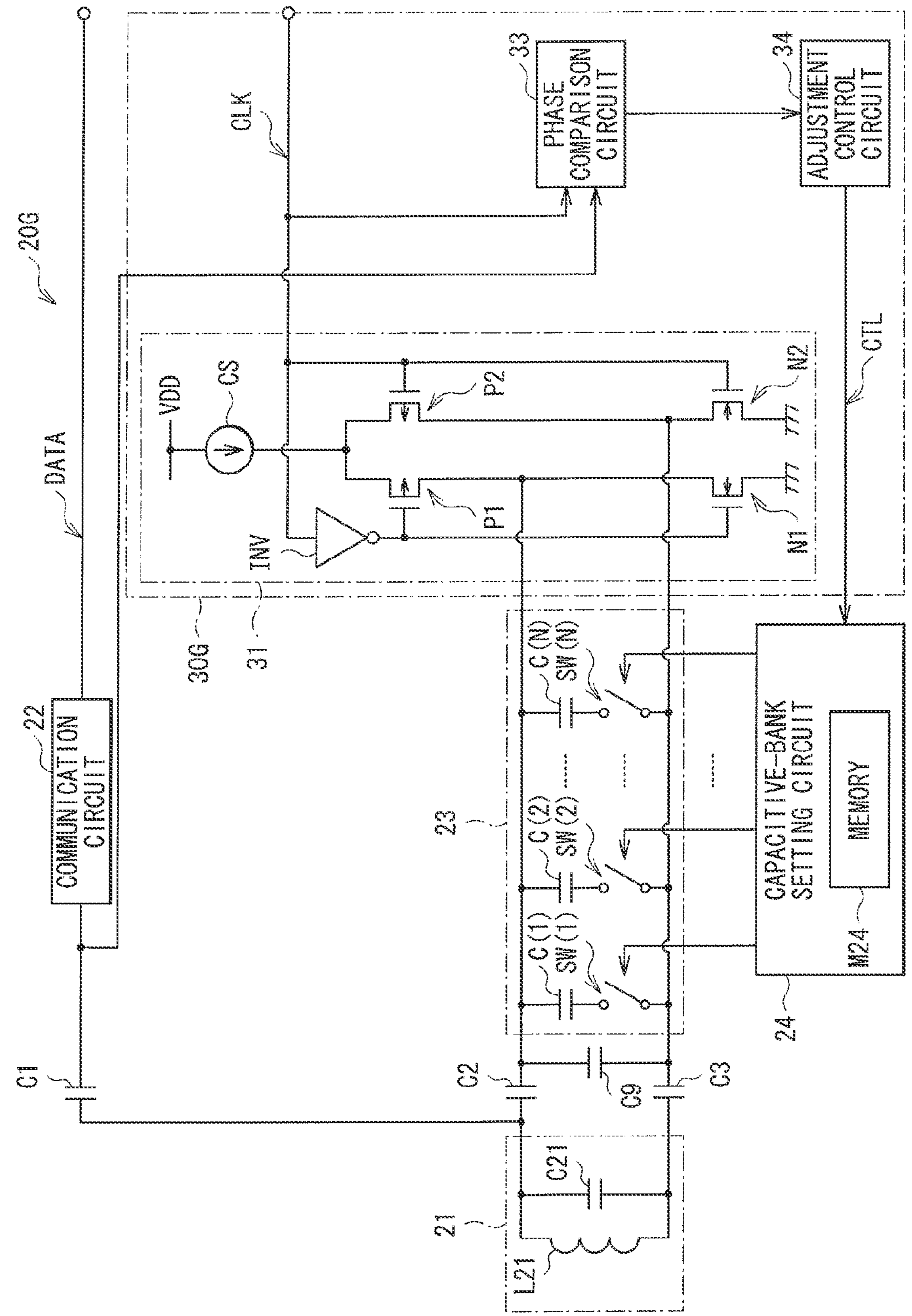
FIG. 9 is a circuit diagram illustrating a configuration example of a non-contact communication section according to another modification.

Further, the embodiment described above uses the comparator 32, although it is not limited thereto. Alternatively, for example, the comparator may not be provided as illustrated in FIG. 9. In a non-contact communication section 20G illustrated in FIG. 9, the phase comparison circuit 33 compares the phases between the clock signal CLK and the signal supplied from the first end of the antenna 21 through the capacitive device C1, and outputs information on the phase difference $\Delta\theta$ to the adjustment control circuit 34. Effects similar to those of the embodiment described above are obtained in this configuration as well.

[Other Modifications]

Figure 10:
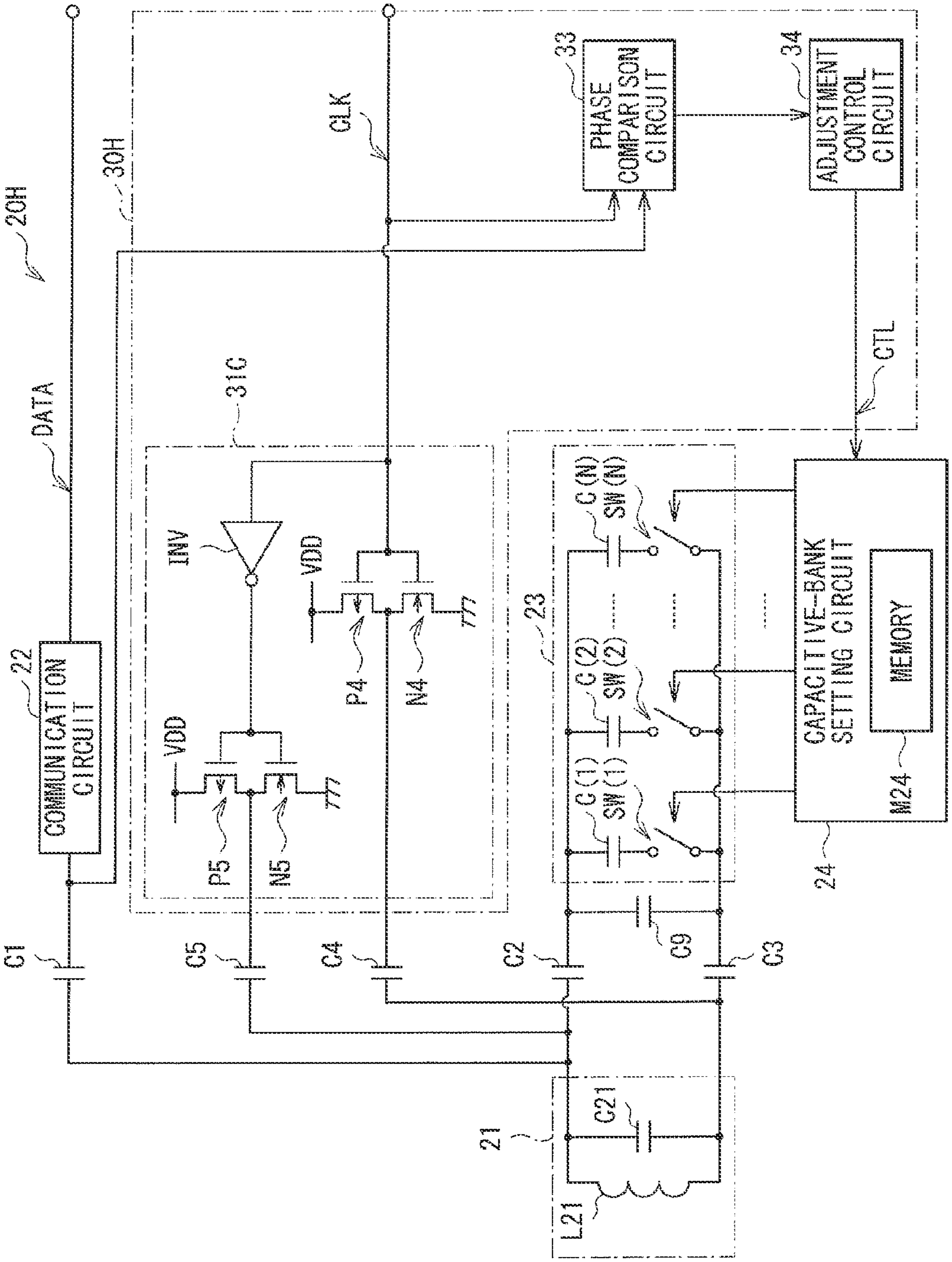
FIG. 10 is a circuit diagram illustrating a configuration example of a non-contact communication section according to another modification.

Moreover, among the modifications described above, two or more modifications may be applied at the same time. As an example, one embodiment where the modifications 4 and 5 are combined is illustrated in FIG. 10.

The technology has been described with reference to the embodiment and the modifications, but is not limited to these embodiment and the modifications, and may be variously modified.

Figure 11:
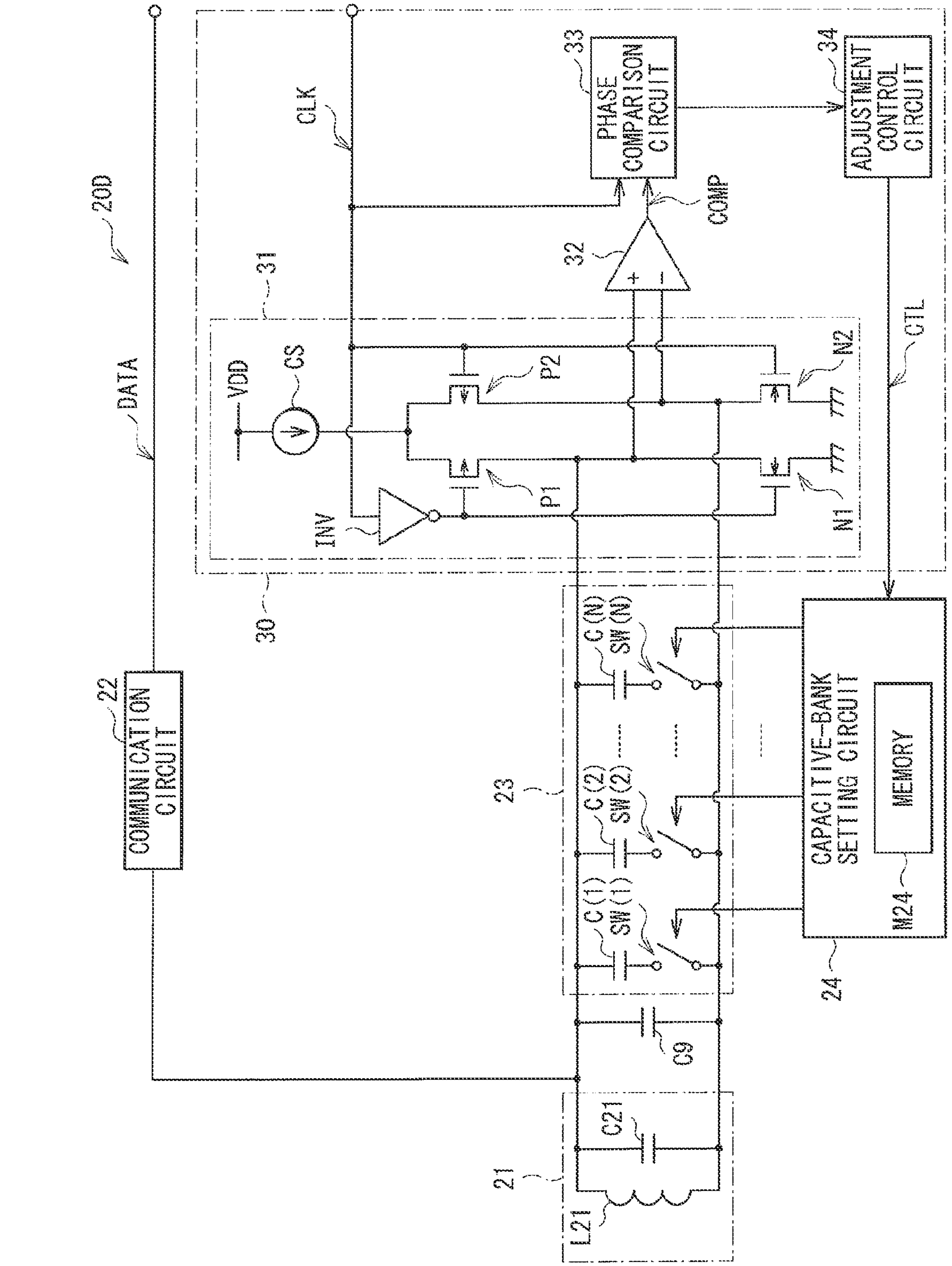
FIG. 11 is a circuit diagram illustrating a configuration example of a non-contact communication section according to another modification.

For example, in the embodiment and the modifications described above, the antenna 21 is connected to the communication circuit 22 and the capacitive bank 23 through the capacitive devices C1 to C3, although it is not limited thereto. Alternatively, in one embodiment, the antenna 21 may be directly connected to the communication circuit 22 and the capacitive bank 23 as illustrated in FIG. 11. Moreover, in one embodiment, only one of the capacitive devices C2 and C3 may be provided.

Figure 12:
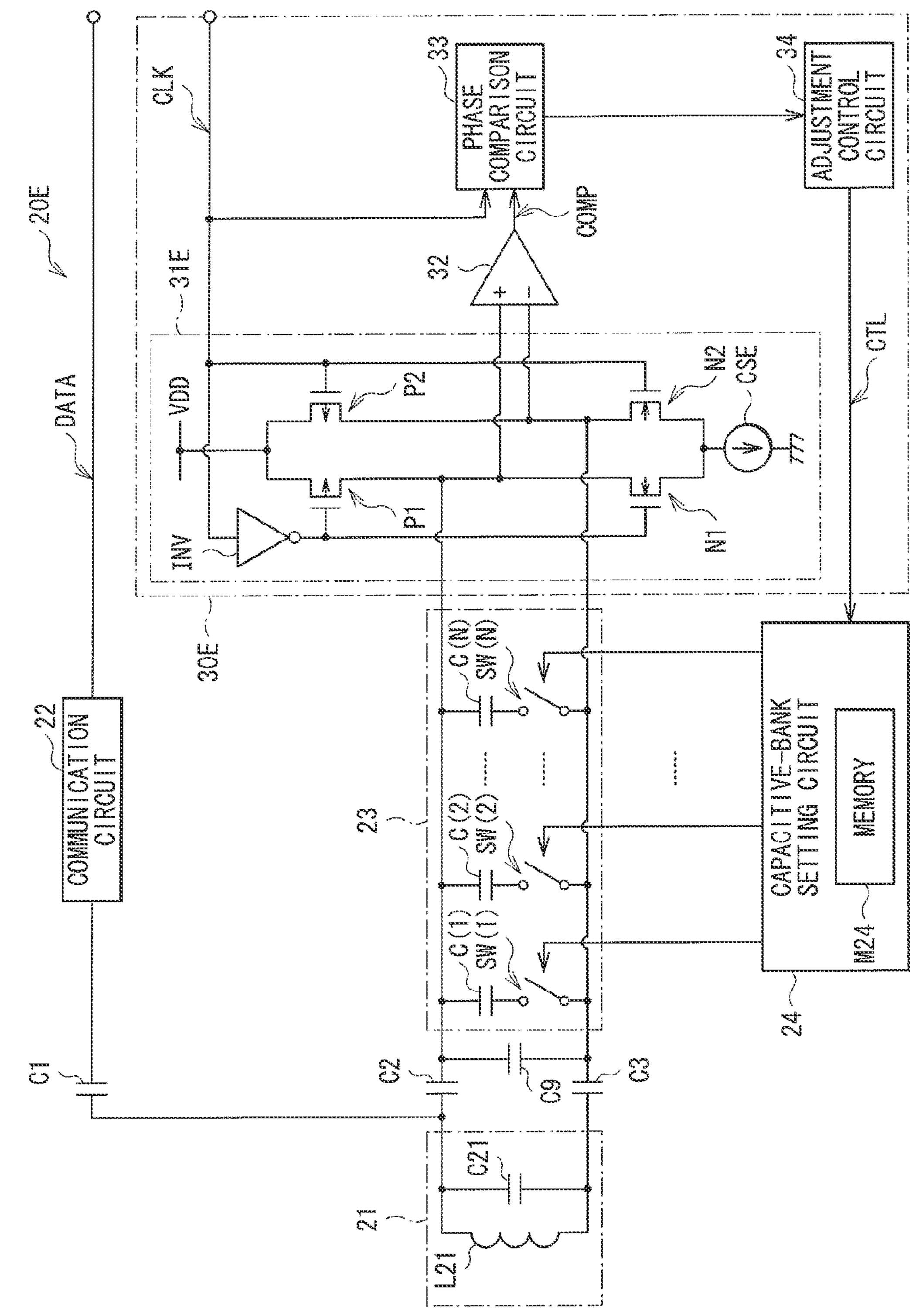
FIG. 12 is a circuit diagram illustrating a configuration example of a non-contact communication section according to another modification.

For example, in the embodiment and the modifications described above, the current source CS is provided on a power supply side of the drive section 31 as illustrated in FIG. 2, although it is not limited thereto. Alternatively, in one embodiment, a current source CSE may be provided on a grounding side as illustrated in FIG. 12.

Figure 13:
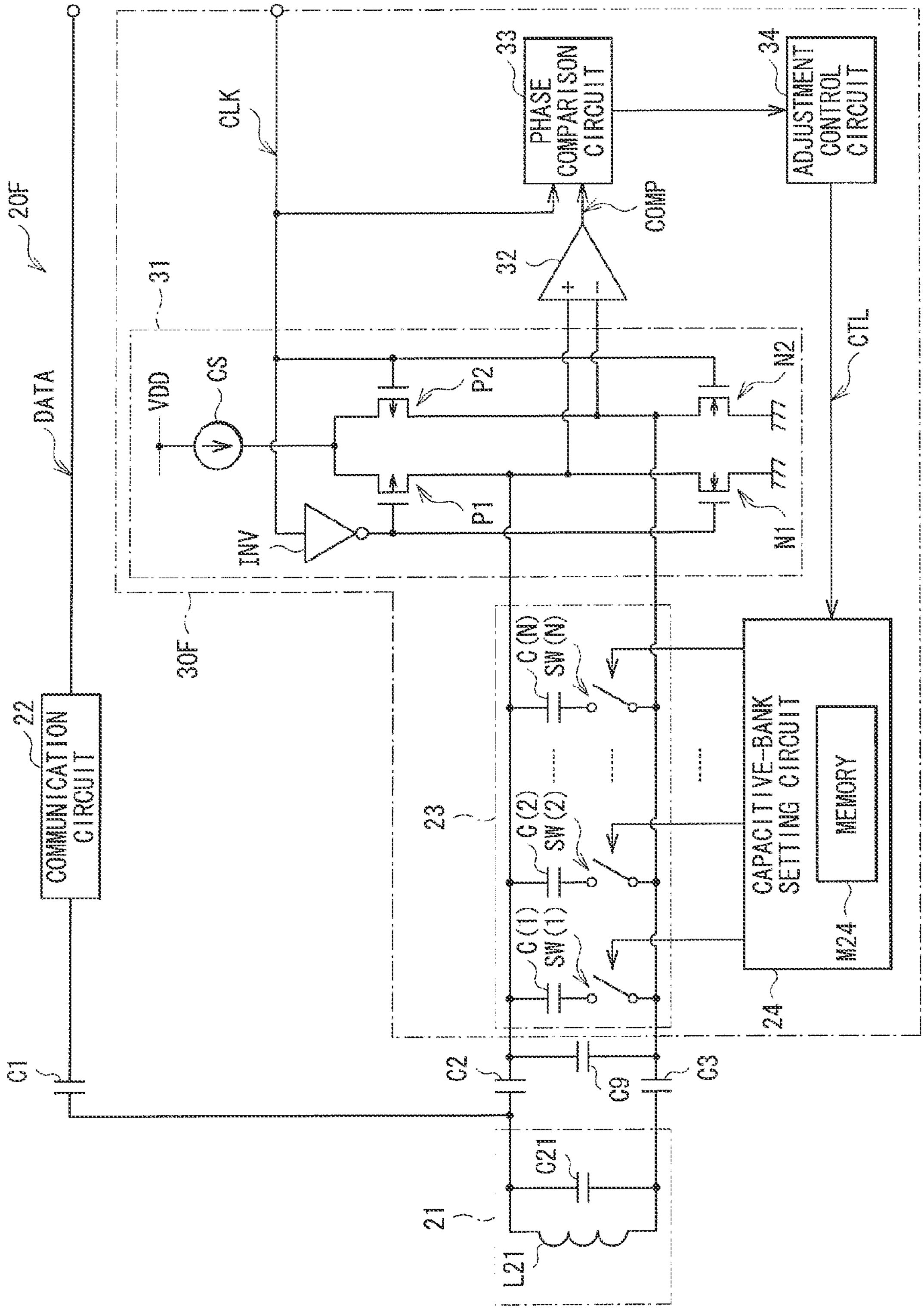
FIG. 13 is a circuit diagram illustrating a configuration example of a non-contact communication section according to another modification.

In one embodiment, an antenna adjustment circuit 30F may be so configured as to include the capacitive bank 23 and the capacitive-bank setting circuit 24 as well, as illustrated in FIG. 13.

Moreover, the embodiment and the modifications have been described by taking the portable telephone as an example, although it is not limited thereto. The embodiment and the modifications are applicable to any kind of unit such as an IC card and a communication module, as long as the unit is a communication unit that includes an antenna.

Accordingly, it is possible to achieve at least the following configurations from the above-described example embodiments and the modifications of the disclosure.

(1) An antenna adjustment circuit, including:
- a drive section inputting an alternating drive signal to a variable capacitance connected to an antenna; and
- a control section setting a capacitance value of the variable capacitance, based on a phase of an output signal derived from the variable capacitance.

(2) The antenna adjustment circuit according to (1), wherein
- the drive section generates the alternating drive signal based on a clock signal, and
- the control section sets the capacitance value of the variable capacitance, based on a phase difference between the clock signal and the output signal.

(3) The antenna adjustment circuit according to (2), wherein the control section sets the capacitance value of the variable capacitance to allow the clock signal and the output signal to have substantially a same phase.

(4) The antenna adjustment circuit according to (2), wherein the variable capacitance includes two terminals, and the drive section includes:
- a first transistor having a gate to which the clock signal is applied, and a drain connected to a first terminal of the two terminals of the variable capacitance, the first transistor being a transistor of a conductive type; and
- a second transistor having a gate to which the clock signal is applied, and a drain connected to the first terminal of the two terminals of the variable capacitance, the second transistor being a transistor of a conductive type different from that of the first transistor.

(5) The antenna adjustment circuit according to (4), wherein the drive section further includes:
- a third transistor having a gate to which an inversion signal of the clock signal is applied, and a drain connected to a second terminal of the two terminals of the variable capacitance, the third transistor being a transistor of a conductive type; and
- a fourth transistor having a gate to which the inversion signal of the clock signal is applied, and a drain connected to the second terminal of the two terminals of the variable capacitance, the fourth transistor being a transistor of a conductive type different from that of the third transistor.

(6) The antenna adjustment circuit according to (5), further including a current source connected to a source of the first transistor and a source of the third transistor.

(7) The antenna adjustment circuit according to (1), wherein the alternating drive signal is an alternating current signal.

(8) The antenna adjustment circuit according to (1), wherein the alternating drive signal is an alternating voltage signal.

(9) The antenna adjustment circuit according to (1), wherein the antenna includes two terminals, and the variable capacitance is connected between the two terminals of the antenna.

(10) The antenna adjustment circuit according to (1), wherein the antenna includes two terminals,
- the variable capacitance includes two terminals,
- a first terminal of the two terminals of the antenna is connected to a first terminal of the two terminals of the variable capacitance via a first capacitive device, and a second terminal of the two terminals of the antenna is connected to a second terminal of the two terminals of the variable capacitance via a second capacitive device.

(11) The antenna adjustment circuit according to (1), wherein the antenna performs parallel resonance.

(12) The antenna adjustment circuit according to (1), wherein the antenna adjustment circuit includes the variable capacitance.

(13) The antenna adjustment circuit according to (1), wherein the variable capacitance includes:

two terminals; and a plurality of capacitive devices, each of the capacitive devices being connected in parallel between the terminals via a switch.

(14) The antenna adjustment circuit according to (13), wherein a capacitance value of each of the capacitive devices is weighted, and an ON resistance of a switch of the switches connected to a capacitive device of the capacitive devices with a larger capacitance value is smaller.

(15) The antenna adjustment circuit according to (2), further including a phase comparison section detecting the phase difference between the clock signal and the output signal, wherein the control section sets the capacitance value of the variable capacitance, based on a comparison result obtained in the phase comparison section.

(16) The antenna adjustment circuit according to (2), further including an amplification section amplifying the output signal, wherein the output signal is a voltage signal, and the control section sets the capacitance value of the variable capacitance, based on the phase difference between the clock signal and the output signal amplified in the amplification section.

(17) The antenna adjustment circuit according to (1), further including a nonvolatile memory that stores data used to set the capacitance value of the variable capacitance.

(18) An antenna adjustment method, including:

inputting an alternating drive signal to a variable capacitance connected to an antenna; and setting a capacitance value of the variable capacitance, based on a phase of an output signal derived from the variable capacitance.

(19) A communication unit with an antenna, a communication section performing communication using the antenna, and an antenna adjustment circuit, the antenna adjustment circuit including:

a drive section inputting an alternating drive signal to a variable capacitance connected to the antenna; and a control section setting a capacitance value of the variable capacitance, based on a phase of an output signal derived from the variable capacitance.

(20) The communication unit according (19), wherein the communication section includes a frequency synthesizer that generates a clock signal, and the drive section generates the alternating drive signal, based on the clock signal.

It should be understood by those skilled in the art that various modifications, combinations, sub-combinations and alterations may occur depending on design requirements and other factors insofar as they are within the scope of the appended claims or the equivalents thereof.

What is claimed is:

1. An antenna adjustment circuit, comprising:

a drive section inputting an alternating drive signal to a variable capacitance connected to an antenna; and a control section setting a capacitance value of the variable capacitance, based on a phase of an output signal derived from the variable capacitance, wherein:

the antenna includes two terminals, the variable capacitance includes two terminals, a first terminal of the two terminals of the antenna is connected to a first terminal of the two terminals of the variable capacitance via a first capacitive device, and a second terminal of the two terminals of the antenna is connected to a second terminal of the two terminals of the variable capacitance via a second capacitive device.

2. The antenna adjustment circuit according to claim 1, wherein the alternating drive signal is an alternating current signal.

3. The antenna adjustment circuit according to claim 1, wherein the alternating drive signal is an alternating voltage signal.

4. The antenna adjustment circuit according to claim 1, wherein the antenna includes two terminals, and the variable capacitance is connected between the two terminals of the antenna.

5. The antenna adjustment circuit according to claim 1, wherein the antenna performs parallel resonance.

6. The antenna adjustment circuit according to claim 1, wherein the antenna adjustment circuit includes the variable capacitance.

7. The antenna adjustment circuit according to claim 1, wherein the variable capacitance includes:

two terminals; and a plurality of capacitive devices, each of the capacitive devices being connected in parallel between the terminals via a switch.

8. The antenna adjustment circuit according to claim 7, wherein a capacitance value of each of the capacitive devices is weighted, and an ON resistance of a switch of the switches connected to a capacitive device of the capacitive devices with a larger capacitance value is smaller.

9. The antenna adjustment circuit according to claim 1, further comprising a nonvolatile memory that stores data used to set the capacitance value of the variable capacitance.

10. An antenna adjustment circuit comprising:

a drive section inputting an alternating drive signal to a variable capacitance connected to an antenna; and a control section setting a capacitance value of the variable capacitance, based on a phase of an output signal derived from the variable capacitance, wherein:

the drive section generates the alternating drive signal based on a clock signal, and the control section sets the capacitance value of the variable capacitance, based on a phase difference between the clock signal and the output signal.

11. The antenna adjustment circuit according to claim 10, wherein the control section sets the capacitance value of the variable capacitance to allow the clock signal and the output signal to have substantially a same phase.

12. The antenna adjustment circuit according to claim 10, wherein the variable capacitance includes two terminals, and the drive section includes:

a first transistor having a gate to which the clock signal is applied, and a drain connected to a first terminal of the two terminals of the variable capacitance, the first transistor being a transistor of a conductive type; and a second transistor having a gate to which the clock signal is applied, and a drain connected to the first terminal of the two terminals of the variable capacitance, the second transistor being a transistor of a conductive type different from that of the first transistor.

13. The antenna adjustment circuit according to claim 12, wherein the drive section further includes:

a third transistor having a gate to which an inversion signal of the clock signal is applied, and a drain connected to a second terminal of the two terminals of the variable capacitance, the third transistor being a transistor of a conductive type; and a fourth transistor having a gate to which the inversion signal of the clock signal is applied, and a drain connected to the second terminal of the two terminals of the variable capacitance, the fourth transistor being a transistor of a conductive type different from that of the third transistor.

14. The antenna adjustment circuit according to claim 13, further comprising a current source connected to a source of the first transistor and a source of the third transistor.

15. The antenna adjustment circuit according to claim 10, further comprising a phase comparison section detecting the phase difference between the clock signal and the output signal, wherein the control section sets the capacitance value of the variable capacitance, based on a comparison result obtained in the phase comparison section.

16. The antenna adjustment circuit according to claim 10, further comprising an amplification section amplifying the output signal, wherein the output signal is a voltage signal, and the control section sets the capacitance value of the variable capacitance, based on the phase difference between the clock signal and the output signal amplified in the amplification section.

17. An antenna adjustment method, comprising:

generating an alternating drive signal based on a clock signal;

inputting the alternating drive signal to a variable capacitance connected to an antenna;

deriving an output signal from the variable capacitance; and setting a capacitance value of the variable capacitance, wherein the capacitance value is set based on a phase difference between the clock signal and the output signal.

18. A communication unit with an antenna, a communication section performing communication using the antenna, and an antenna adjustment circuit, the antenna adjustment circuit comprising:

a drive section inputting an alternating drive signal to a variable capacitance connected to the antenna; and a control section setting a capacitance value of the variable capacitance, based on a phase of an output signal derived from the variable capacitance, wherein:

the antenna includes two terminals, the variable capacitance includes two terminals, a first terminal of the two terminals of the antenna is connected to a first terminal of the two terminals of the variable capacitance via a first capacitive device, and a second terminal of the two terminals of the antenna is connected to a second terminal of the two terminals of the variable capacitance via a second capacitive device.

19. The communication unit according claim 18, wherein the communication section includes a frequency synthesizer that generates a clock signal, and the drive section generates the alternating drive signal, based on the clock signal.

* * * * *